US008913820B2

(12) United States Patent
Bennett et al.

(10) Patent No.: US 8,913,820 B2
(45) Date of Patent: Dec. 16, 2014

(54) STORE IMAGES AT POINT OF CAPTURE

(71) Applicant: Bank of America Corporation, Charlotte, NC (US)

(72) Inventors: Deborah N. Bennett, Conyers, GA (US); Timmy L. Gauvin, Peachtree City, GA (US); Eric Scott Sandoz, Concord, CA (US); James G. Ronca, Decatur, GA (US)

(73) Assignee: Bank of America Corporation, Charlotte, NC (US)

( * ) Notice: Subject to any disclaimer, the term of this patent is extended or adjusted under 35 U.S.C. 154(b) by 197 days.

(21) Appl. No.: 13/768,417

(22) Filed: Feb. 15, 2013

(65) Prior Publication Data

US 2014/0233832 A1    Aug. 21, 2014

(51) Int. Cl.
*G06K 9/00* (2006.01)
*G06Q 40/00* (2012.01)

(52) U.S. Cl.
CPC .................................. *G06K 9/00469* (2013.01)
USPC .............................. 382/137; 382/284; 705/44

(58) Field of Classification Search
USPC ......... 382/100, 103, 112–116, 135–140, 151, 382/155, 162, 168, 173, 181, 187–188, 199, 382/209, 216–219, 232, 254, 274, 276, 382/284–301, 305, 312; 235/379; 715/838; 705/44, 45; 194/207
See application file for complete search history.

(56) References Cited

U.S. PATENT DOCUMENTS

| 7,702,588 | B2 * | 4/2010 | Gilder et al. ..................... 705/44 |
| 8,045,784 | B2 * | 10/2011 | Price et al. ..................... 382/137 |
| 8,474,704 | B1 * | 7/2013 | Grimm et al. ................. 235/379 |
| 8,714,336 | B2 * | 5/2014 | Csulits et al. ................. 194/207 |
| 2010/0122216 | A1 * | 5/2010 | Song et al. ..................... 715/838 |

* cited by examiner

*Primary Examiner* — Seyed Azarian
(74) *Attorney, Agent, or Firm* — Michael A. Springs; Moore and Van Allen, PLLC; Trent R. McKenzie

(57) ABSTRACT

Embodiments of the invention are directed to systems, methods, and computer program products for capturing, processing, storing, and generating images of a check. In some embodiments, a system is configured to: receive an unprocessed image of a check; store the unprocessed image, wherein the unprocessed image is accessible to an agent associated with the apparatus and is not accessible to a user of an account associated with the check; process the unprocessed image to create a processed image; store the processed image, wherein the processed image is accessible to the agent and is accessible to the user.

18 Claims, 12 Drawing Sheets

STORE IMAGES AT POINT OF CAPTURE

BACKGROUND

When an entity (e.g. a financial institution) receives high volumes of images of financial documents (checks, lease documents, deposit slips, or the like), there is a need to capture, process, store, and generate the images as efficiently as possible.

BRIEF SUMMARY

Embodiments of the invention are directed to systems, methods, and computer program products for capturing, processing, storing, and generating images of a check. In some embodiments, an apparatus is provided for enabling access to an image of a check. The apparatus comprises: a memory; a processor; and a module stored in the memory, executable by the processor, and configured to: receive an unprocessed image of a check; store the unprocessed image, wherein the unprocessed image is accessible to an agent associated with the apparatus and is not accessible to a user of an account associated with the check; process the unprocessed image to create a processed image; store the processed image, wherein the processed image is accessible to the agent and is accessible to the user.

In some embodiments, receiving the unprocessed image further comprises capturing the unprocessed image.

In some embodiments, processing the unprocessed image further comprises creating a thumbnail version of the unprocessed image.

In some embodiments, processing the unprocessed image further comprises collecting check information.

In some embodiments, the check information comprises text or an image.

In some embodiments, the module is further configured to store the check information in an archive.

In some embodiments, processing the unprocessed image further comprises processing the unprocessed image of the check in less than or equal to three days.

In some embodiments, processing the unprocessed image comprises at least one of: selectively processing individual pieces of check information associated with the unprocessed image based on each type of check information; processing multiple pieces of check information associated with the unprocessed image substantially simultaneously.

In some embodiments, the module is further configured to enable the agent to edit individual pieces of check information associated with the unprocessed image during the processing of the unprocessed image.

In some embodiments, the module is further configured to determine the authenticity of the user or the user's habits by cross-referencing the unprocessed image with a database of customer accounts, frequent transactions, or security answers.

In some embodiments, the module is further configured to enable editing of the check information.

In some embodiments, processing the unprocessed image further comprises treating the image.

In some embodiments, the module is further configured to communicate with a second apparatus.

In some embodiments, the second apparatus includes at least one of a mobile device, an offsite server, an internal server, a new memory location, a datastore, or an archive.

In some embodiments, the module is further configured to create a reference as an index for the stored image, wherein the reference functions as an index to locate the stored image.

In some embodiments, the reference comprises a sequence number or a unique identification number.

In some embodiments, processing the unprocessed image comprises resizing or changing a resolution of the unprocessed image to create the processed image.

In some embodiments, the module is further configured to associate the unprocessed image with the processed image.

In some embodiments, a method is provided for enabling access to an image of a check. The method comprises: receiving an unprocessed image of a check; storing the unprocessed image, wherein the unprocessed image is accessible to an agent associated with the apparatus and is not accessible to a user of an account associated with the check; processing the unprocessed image to create a processed image; storing the processed image, wherein the processed image is accessible to the agent and is not accessible to the user.

In some embodiments, a computer program product is provided for enabling access to an image of a check. The computer program product comprises a non-transitory computer-readable medium comprising code causing a computer to: receive an unprocessed image of a check; store the unprocessed image, wherein the unprocessed image is accessible to an agent associated with the apparatus and is not accessible to a user of an account associated with the check; process the unprocessed image to create a processed image; store the processed image, wherein the processed image is accessible to the agent and is not accessible to the user.

BRIEF DESCRIPTION OF THE DRAWINGS

Figure 1:
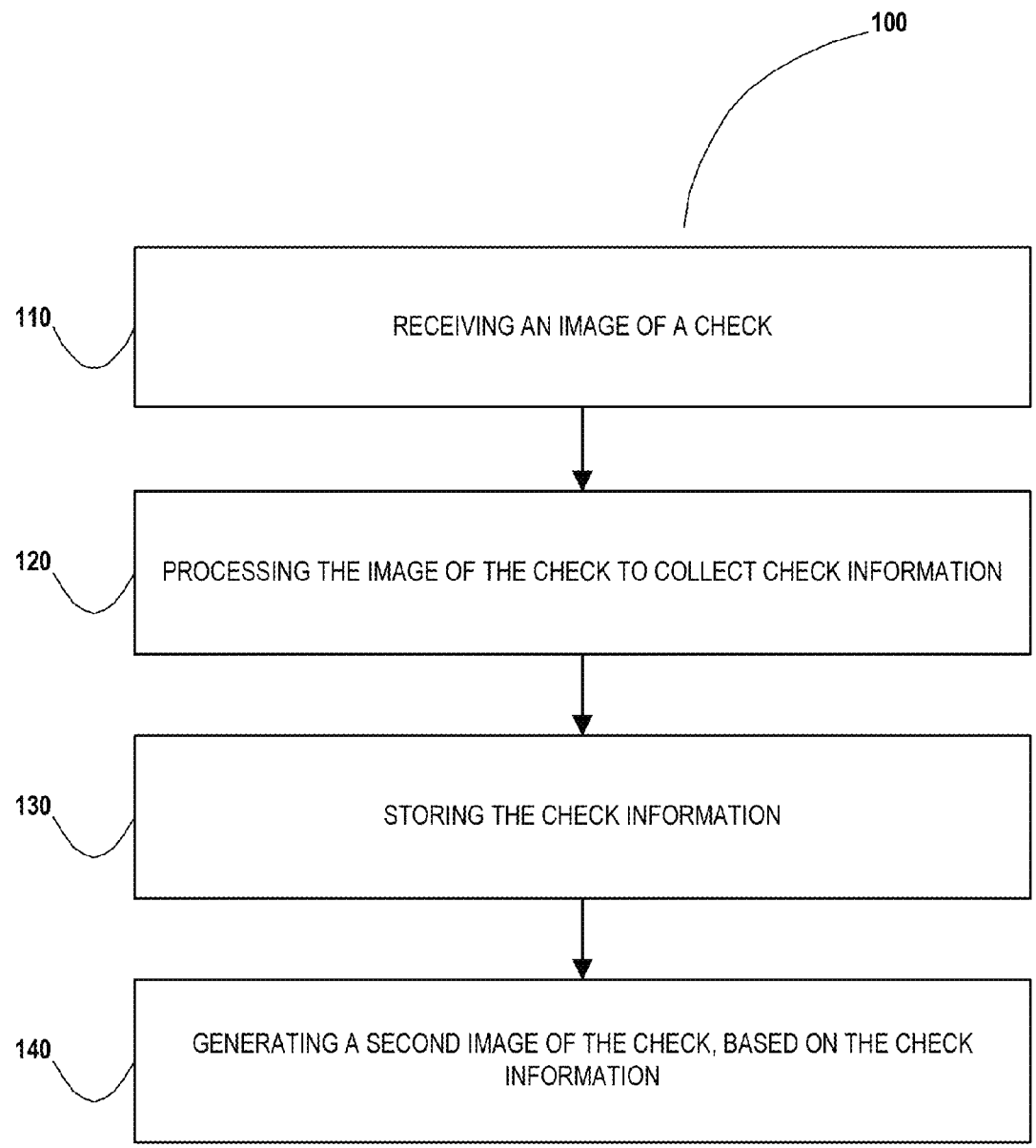
Figure 2:
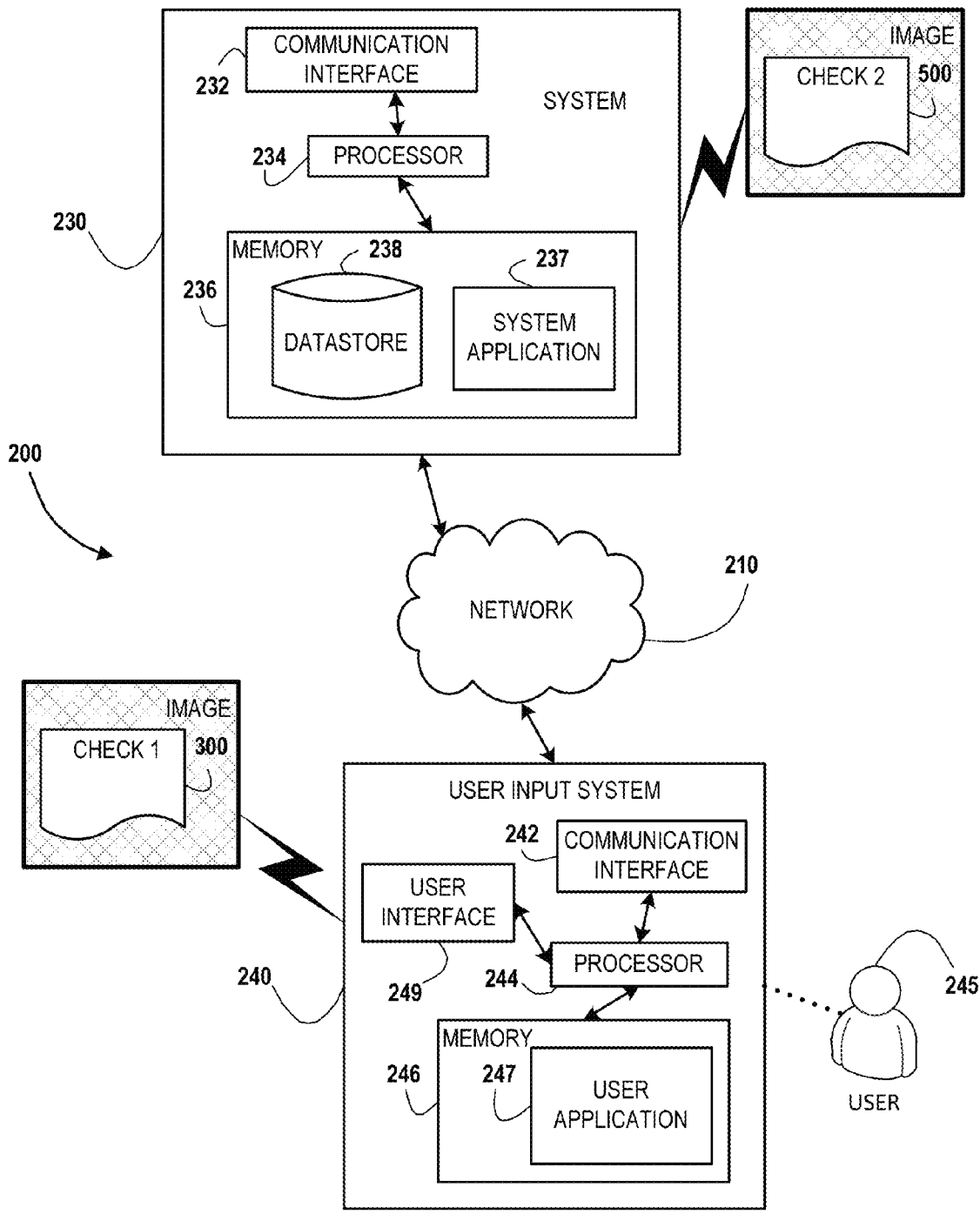
Figure 3:
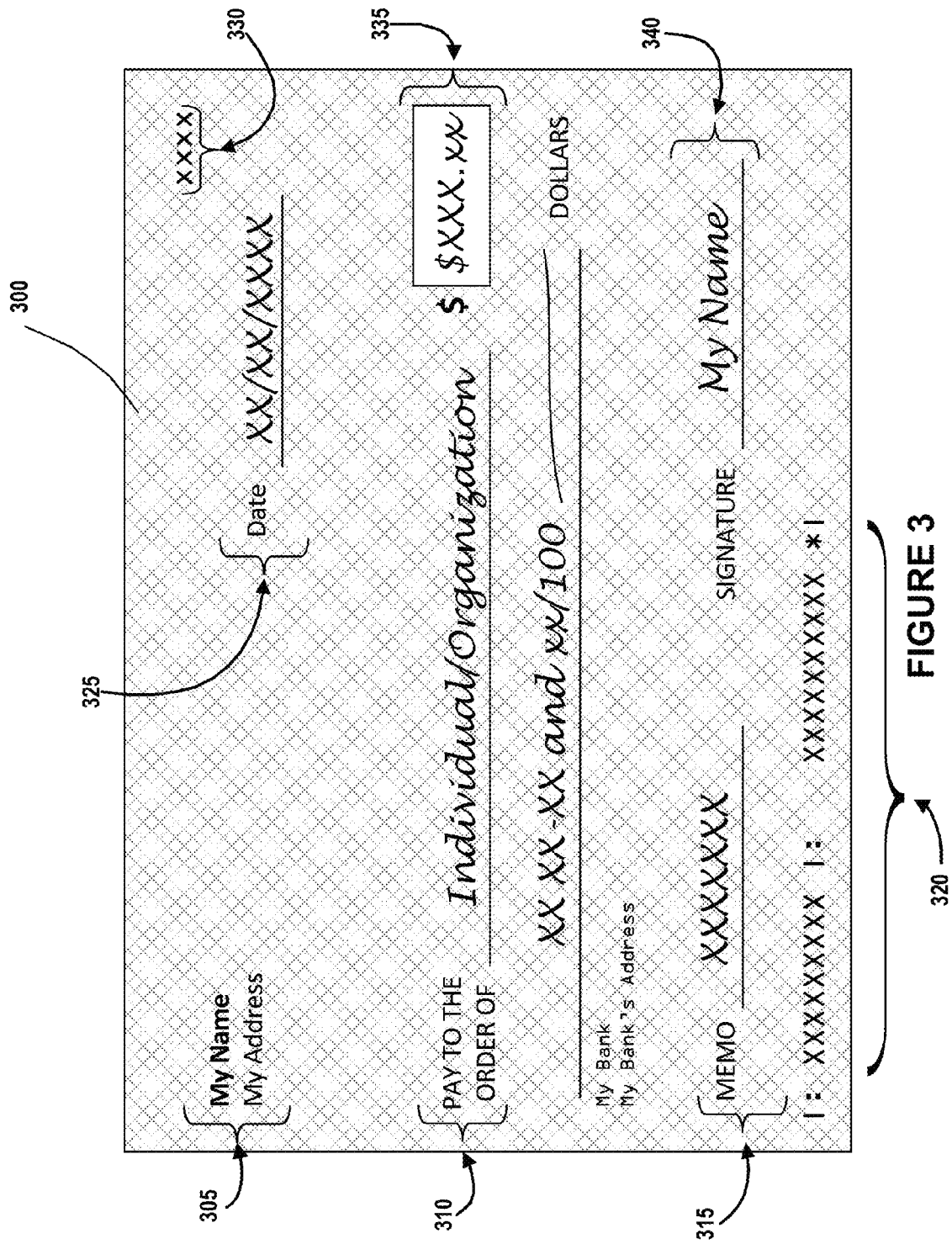
Figure 4:
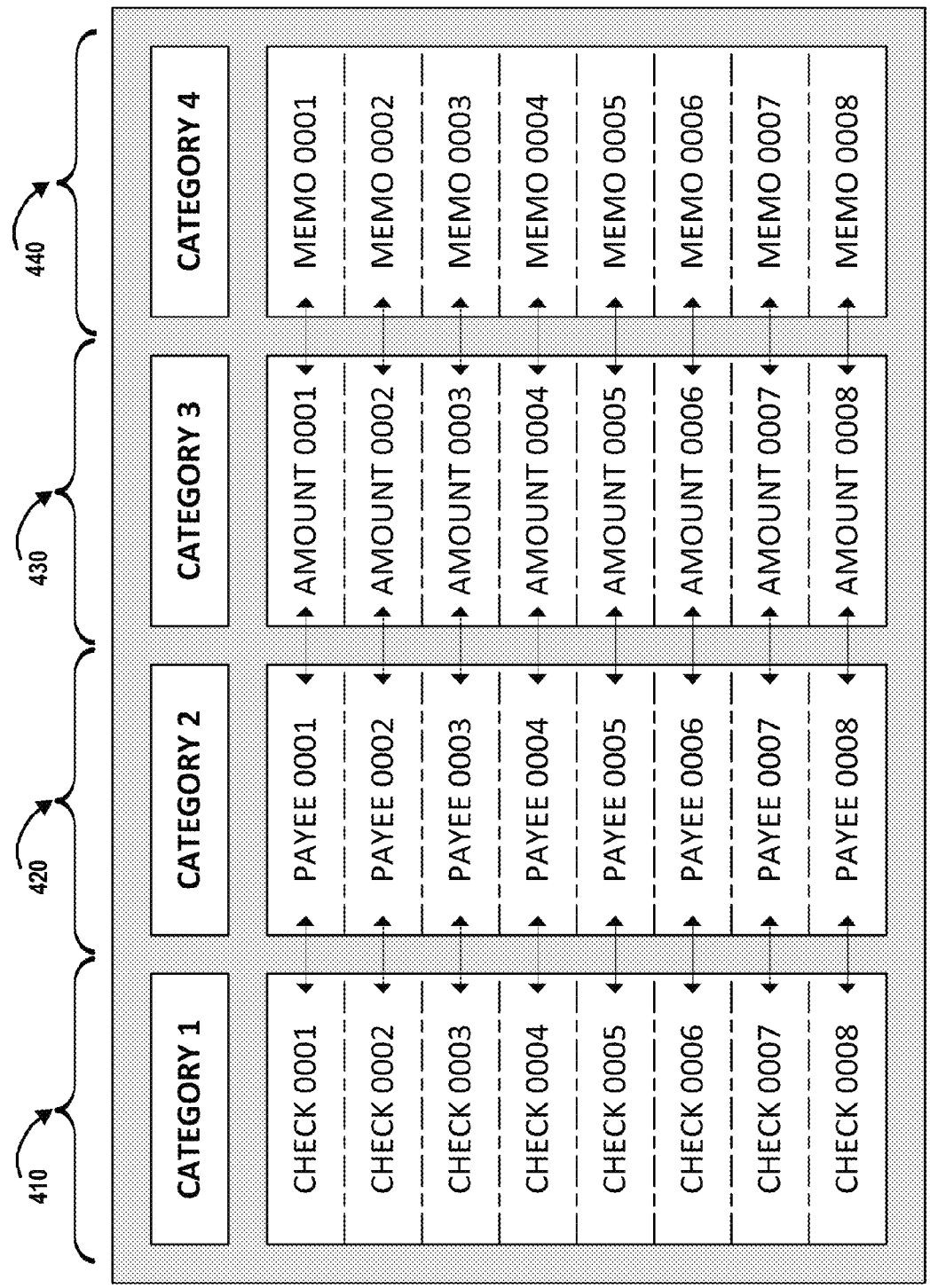
Figure 5:
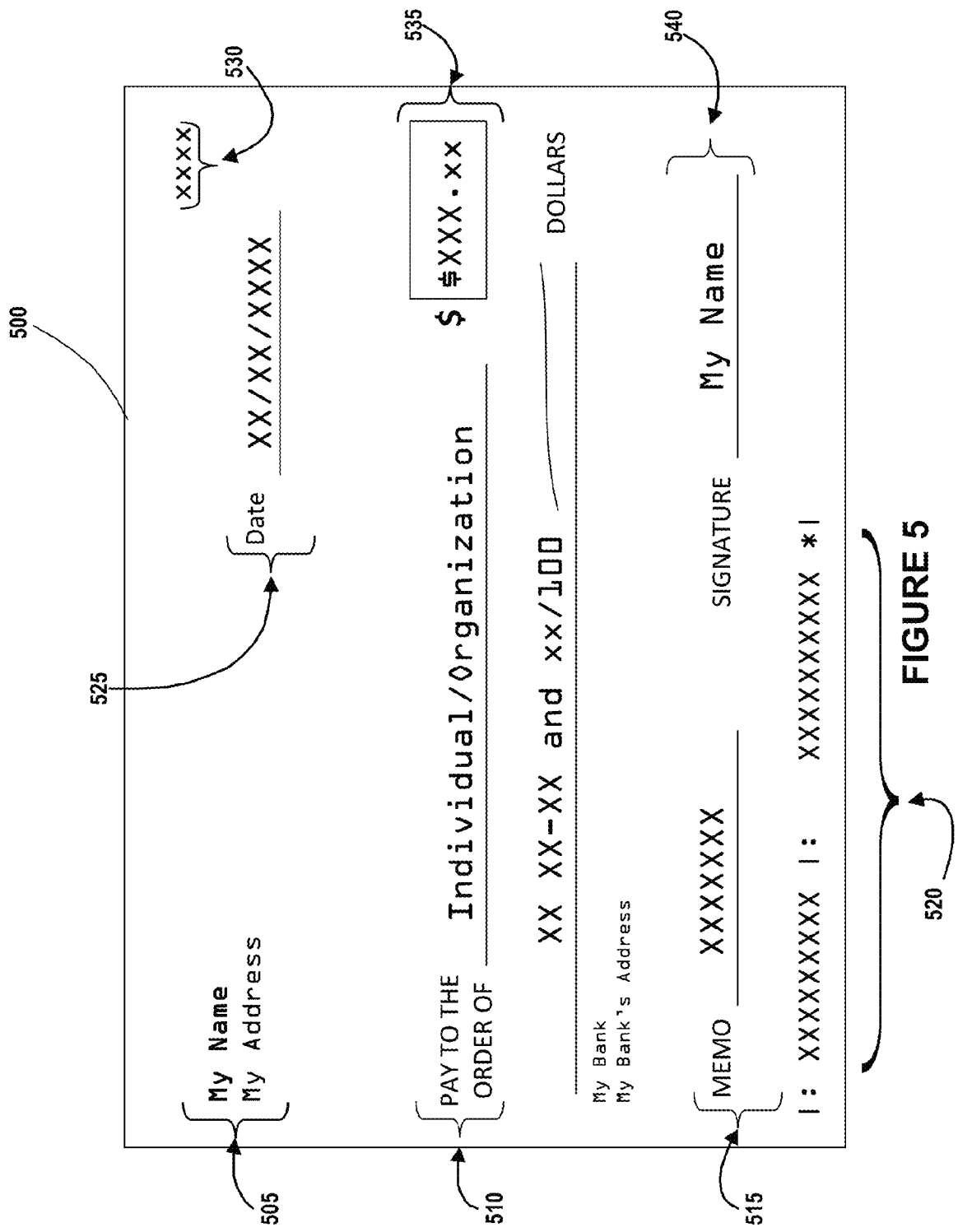
Figure 6:
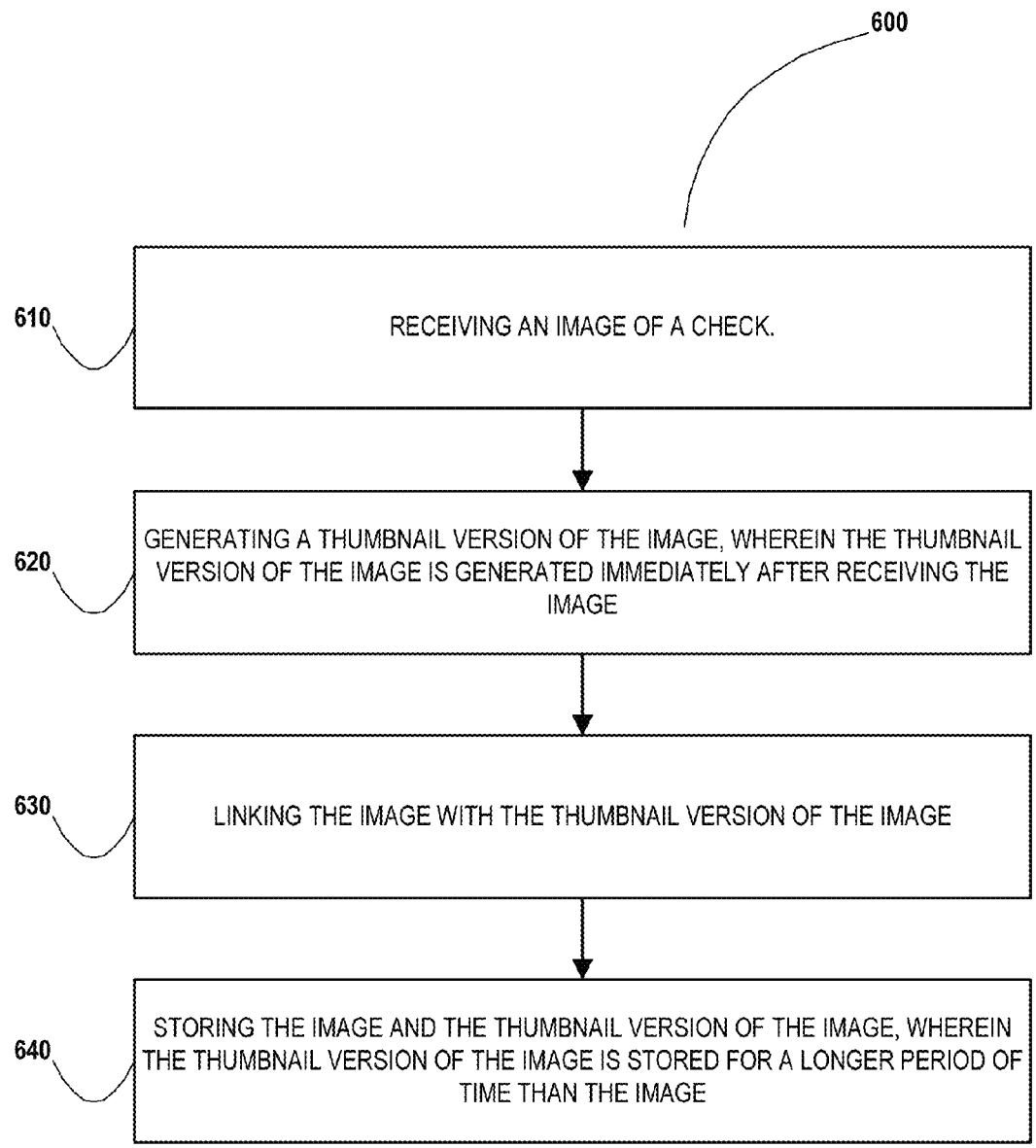
Figure 7:
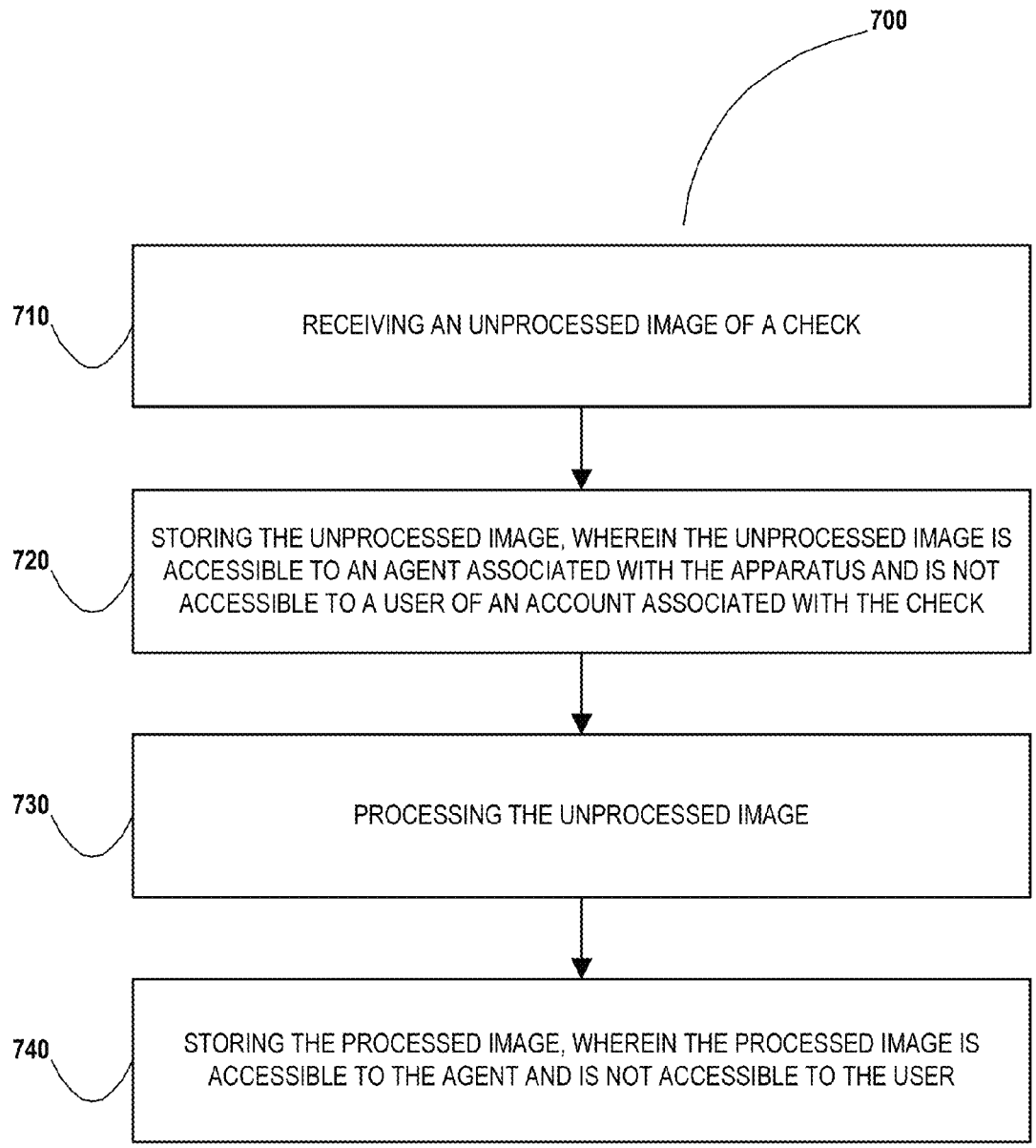
Figure 8:
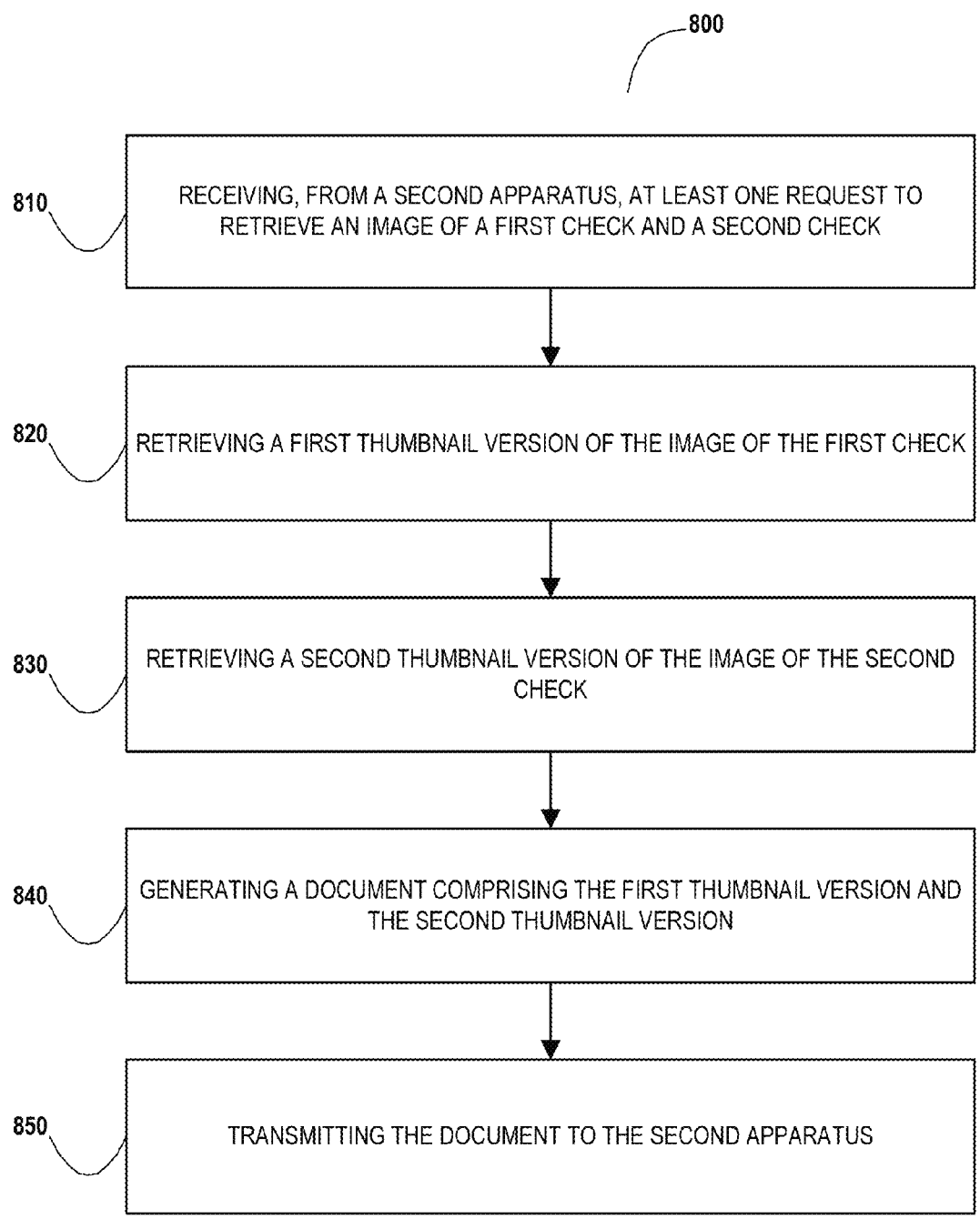
Figure 9:
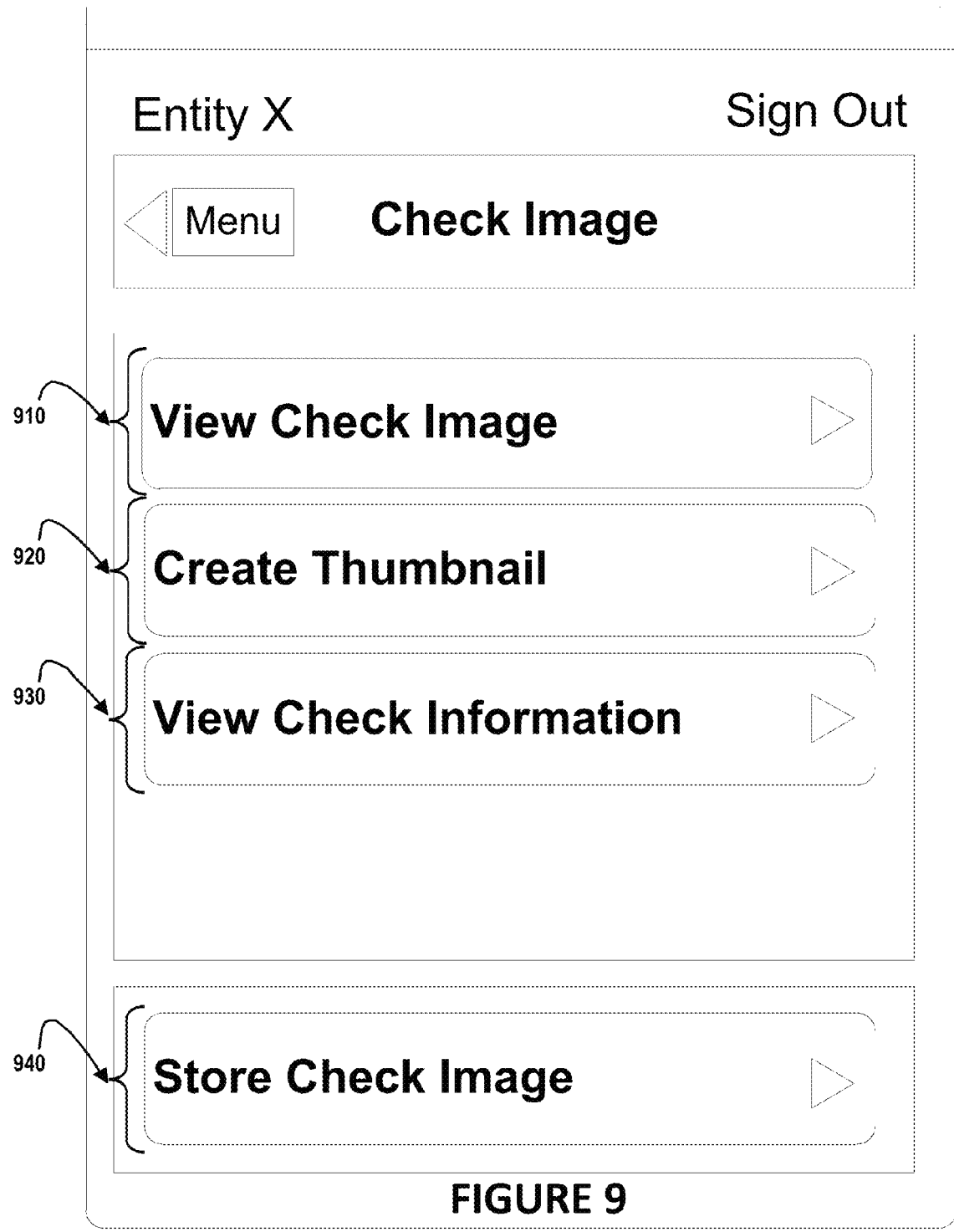
Figure 10:
Figure 11:
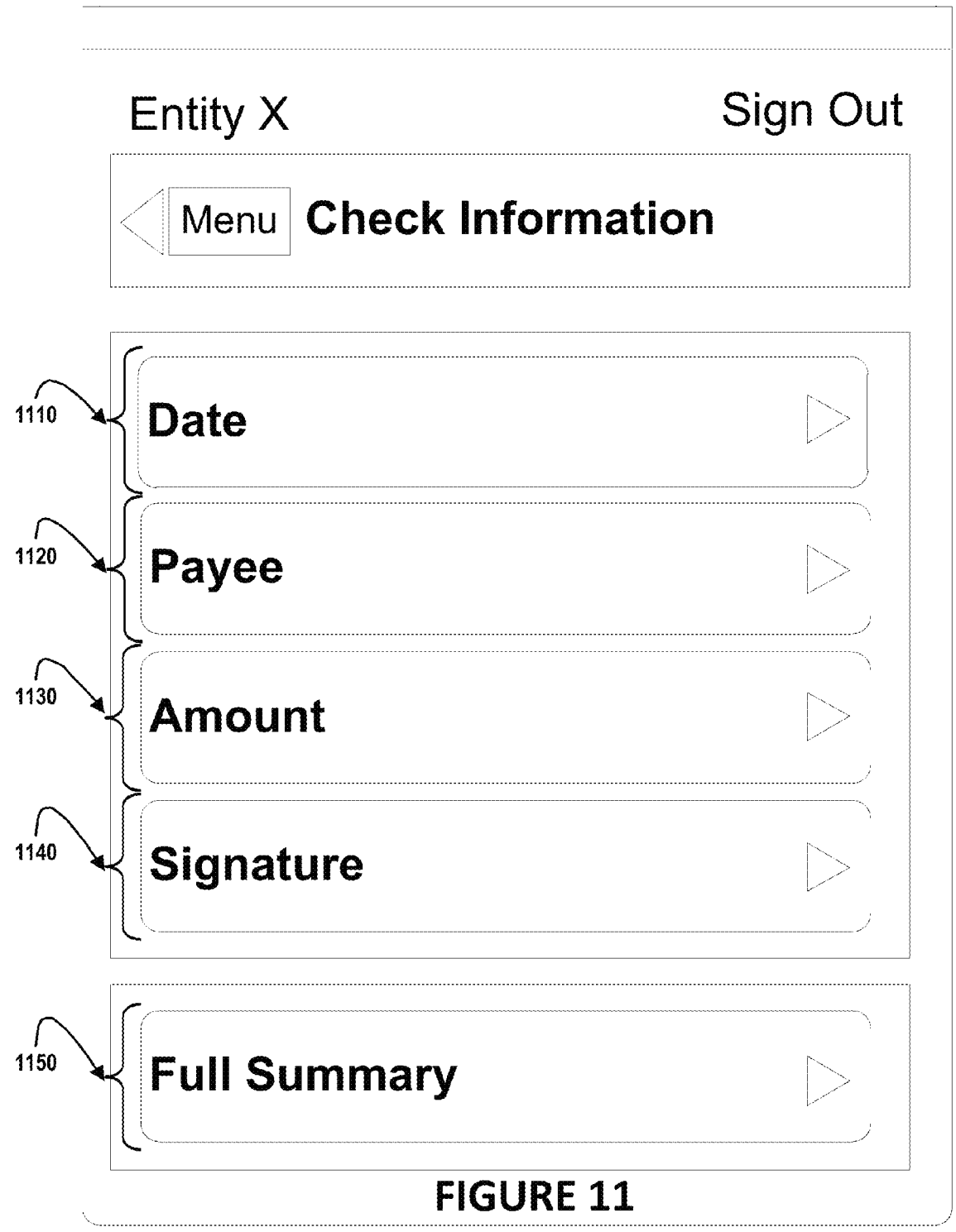
Figure 12:
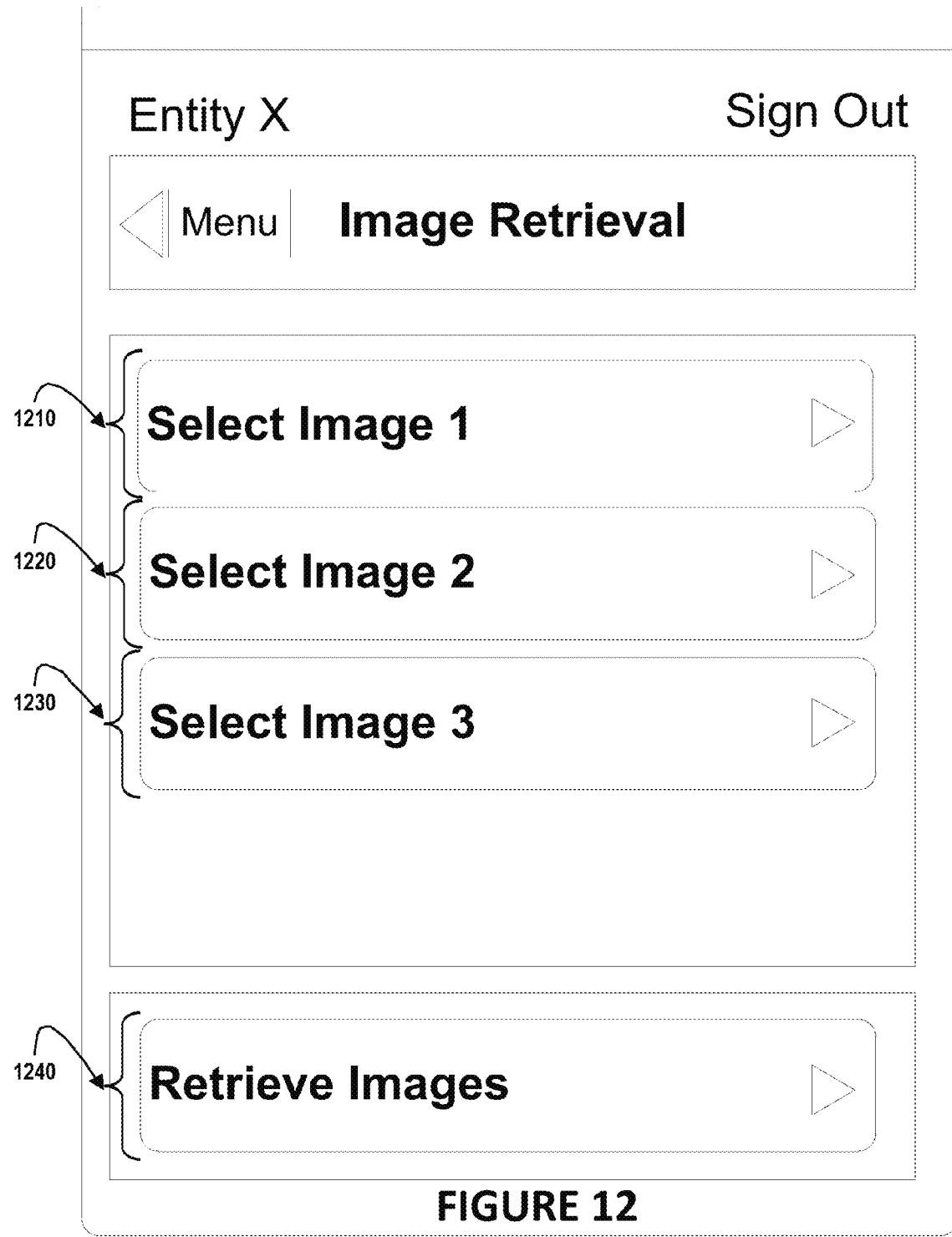

Having thus described embodiments of the invention in general terms, reference will now be made to the accompanying drawings, where:

FIG. 1 is a flowchart illustrating a general process flow for the complete system of receiving, processing, storing, and generating an image of a check, in accordance with embodiments of the present invention;

FIG. 2 is a block diagram illustrating technical components of a system for storing an image of a check, enabling access to an image of a check, and processing at least one request to retrieve an image of a first check and a second check, in accordance with embodiments of the present invention;

FIG. 3 illustrates an exemplary check image that is to be retrieved by the user input system and processed by the system from which check information is collected, in accordance with embodiments of the present invention;

FIG. 4 illustrates an exemplary datastore for storing the check information, in accordance with the embodiments of the present invention;

FIG. 5 illustrates an exemplary check image that is to be generated by the system based on the stored check information, in accordance with the embodiments of the present invention;

FIG. 6 is a flowchart illustrating a general process flow for storing an image of a check, in accordance with the embodiments of the present invention;

FIG. 7 is a flowchart illustrating a general process flow for enabling access to an image of a check, in accordance with the embodiments of the present invention;

FIG. 8 is a flowchart illustrating a general process flow for processing at least one request to retrieve an image of a first check and a second check, in accordance with the embodiments of the present invention;

FIG. 9 illustrates an exemplary user interface for storing an image of a check, in accordance with the embodiments of the present invention;

FIG. 10 illustrates an exemplary user interface for enabling access to an image of a check, in accordance with the embodiments of the present invention;

FIG. 11 illustrates an exemplary user interface for viewing information from the image of a check, in accordance with the embodiments of the present invention;

FIG. 12 illustrates an exemplary user interface for processing at least one request to retrieve an image of a first check and a second check, in accordance with the embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments of the invention are directed to systems, methods and computer program products for retrieving, capturing, storing, duplicating, modifying, and recalling image of the checks, in accordance with embodiments of the present invention.

In some embodiments, an "entity" as used herein may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, a non-monetary user profile that includes only personal information associated with the user, or the like. The account is associated with and/or maintained by an entity. In other embodiments, an "entity" may not be a financial institution.

In some embodiments, the "user" may be a customer (e.g., an account holder or a person who has an account (e.g., banking account, credit account, or the like) at the entity). The user may also be an agent (customer service representative, internal operations specialist, bank teller, account manager, or the like) associated with the entity.

As used herein, a "check" may also refer to a myriad of financial documents, including but not limited to a lease document, a mortgage document, a deposit slip, a payment coupon, a receipt, or the like. In some embodiments, the check may exist as a physical item printed on paper or other medium. In other embodiments, the check may exist electronically.

The present invention is centered on check imaging technology with a purpose of saving storage space in the archive of an entity (e.g., a financial institution). Currently, an entity's check imaging system may receive an image of a check at a high resolution (200 dots per inch (DPI)) and may store the image in the archive at this resolution for a mandated period of seven years. However, regulations may not require that the archived image be of this high resolution. To save storage space in the archive, the present invention may capture pieces of the check information by processing the image of the check and then store the various pieces of the check information as either text or smaller high resolution (or low resolution) images. The pieces of check information may then be retrieved individually or in bulk by an apparatus to generate a second image of the check. Furthermore, the present invention may create a thumbnail version of the image of the check at a lower resolution and store said thumbnail version of the image of the check in the archive for seven years in lieu of storing the high resolution image of the check. A check is an example of a document that may be captured or processed in this invention. As used herein, a "check" may also refer to a myriad of financial documents, including but not limited to a lease document, a mortgage document, a deposit slip, a payment coupon, a receipt, or the like. In some embodiments, the check may exist as a physical item printed on paper or other medium. In other embodiments, the check may exist electronically.

Referring now to FIG. 1, FIG. 1 presents a general process flow 100, in accordance with some embodiments of the invention. At block 110, the method comprises receiving an image of a check. In some embodiments, the image of the check may be received by an apparatus (e.g. a computer system) via a user's mobile device, a camera, an Automated Teller Machine (ATM) at one of the entity's facilities, a second apparatus at a teller's station, or the like. In other embodiments, the apparatus may be configured to capture the image of the check. An example of an apparatus that performs block 110 is the user input system 240 in FIG. 2.

At block 120, the method comprises processing the image of the check to collect check information. After the successful retrieval or capture of the image of the check, the apparatus may process the image of the check. The apparatus may capture individual pieces of check information from the image of the check. In some embodiments, the check information may be text. In other embodiments, the check information may be an image. Further processing enables the apparatus to create a thumbnail version (a resized smaller version) of the image of the check at a lower resolution. In some embodiments, the thumbnail version of the image of the check may be created substantially simultaneously to the capture of the image of the check. An example of the apparatus that performs block 120 is the system 230 in FIG. 2.

At block 130, the method comprises storing the check information. After the image of the check is processed, the apparatus may store the collected check information. In some embodiments, the individual pieces of check information may be stored separately, and may be associated with each other via data or metadata. In some embodiments, the individual pieces of check information may be stored together. In some embodiments, the apparatus may additionally store the original image of the check immediately after the image of the check is received. Because the original high resolution image of the check must be held in storage for a 90 day period, the high resolution image of the check may be deleted 90 days (or any time thereafter) following its capture. In some embodiments, the apparatus may additionally store the thumbnail version of the image of the check. The entity may reserve the right to determine how to process and/or how long to store the check information, image of the check, and/or the thumbnail version of the check. An example of the apparatus that performs block 130 is the system 230 in FIG. 2.

At block 140, the method comprises generating a second image of the check, based on the check information. If the user wishes to view the image of the check, the apparatus may generate a second image of the check based on the stored check information (text, images, or the like). In some embodiments, pieces of the check information may be requested individually. In these embodiments, pieces of the check information may be delivered individually based on the user's request. For example, if the user wishes to view just the check number, the apparatus may deliver to the user just the check number, not the entire image of the check. In other embodiments, multiple pieces of the check information may be retrieved. For example, if the user wishes to view an image of the entire check, the apparatus may retrieve multiple pieces of check information and produce for the user an image of the check. In some embodiments, the generated image of the check may accurately present the stored check information on a standard template (e.g. a check with a blank or plain background). Furthermore, utilizing a grayscale format when storing and generating the image of the check may require less storage space than storing and generating a detailed, colored background of the check. The entity may reserve the right to determine the design or style of the check template.

Referring now to FIG. 2, FIG. 2 presents an exemplary block diagram of the system environment 200 for implementing the process flow described in FIG. 1 in accordance with embodiments of the present invention. As illustrated, the system environment 200 includes a network 210, a system 230, and a user input system 240. Also shown in FIG. 2 is a user 245 of the user input system 240. The user input system 240 may be a mobile device described herein. The user 245 may be a person who uses the user input system 240 to execute a user application 247. The user application 247 may be an application to communicate with the system 230, perform a transaction, input information onto a user interface presented on the user input system 240, or the like. The user application 247 and/or the system application 237 may incorporate one or more parts of any process flow described herein.

As shown in FIG. 2, the system 230, and the user input system 240 are each operatively and selectively connected to the network 210, which may include one or more separate networks. In addition, the network 210 may include a telecommunication network, local area network (LAN), a wide area network (WAN), and/or a global area network (GAN), such as the Internet. It will also be understood that the network 210 may be secure and/or unsecure and may also include wireless and/or wireline and/or optical interconnection technology.

The user input system 240 may include any computerized apparatus that can be configured to perform any one or more of the functions of the user input system 240 described and/or contemplated herein. For example, the user 245 may use the user input system 240 to transmit and/or receive information or commands to and from the system 230. In some embodiments, for example, the user input system 240 may include a personal computer system, a mobile computing device, a personal digital assistant, a mobile phone, a tablet computing device, a network device, an ATM, a bank teller's equipment, and/or the like. As illustrated in FIG. 2, in accordance with some embodiments of the present invention, the user input system 240 includes a communication interface 242, a processor 244, a memory 246 having an user application 247 stored therein, and a user interface 249. In such embodiments, the communication interface 242 is operatively and selectively connected to the processor 244, which is operatively and selectively connected to the user interface 249 and the memory 246. In some embodiments, the user 245 may use the user application 247 to execute processes described with respect to the process flows described herein. Specifically, the user application 247 executes the process flow described in FIG. 1, as well as any other process flow described herein.

Each communication interface described herein, including the communication interface 242, generally includes hardware, and, in some instances, software, that enables the user input system 240, to transport, send, receive, and/or otherwise communicate information to and/or from the communication interface of one or more other systems on the network 210. For example, the communication interface 242 of the user input system 240 may include a wireless transceiver, modem, server, electrical connection, and/or other electronic device that operatively connects the user input system 240 to another system such as the system 230. The wireless transceiver may include a radio circuit to enable wireless transmission and reception of information. Additionally, the user input system 240 may include a positioning system. The positioning system (e.g., a global positing system GPS) may enable at least one of the user input system 240 or an external server or computing device in communication with the user input system 240 to determine the location (e.g., location coordinates) of the user input system 240.

Each processor described herein, including the processor 244, generally includes circuitry for implementing the audio, visual, and/or logic functions of the user input system 240. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 247 of the memory 246 of the user input system 240.

Each memory device described herein, including the memory 246 for storing the user application 247 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

As shown in FIG. 2, the memory 246 includes the user application 247. In some embodiments, the user application 247 includes an interface for communicating with, navigating, controlling, configuring, and/or using the user input system 240. In some embodiments, the user application 247 includes computer-executable program code portions for instructing the processor 244 to perform one or more of the functions of the user application 247 described and/or contemplated herein. In some embodiments, the user application 247 may include and/or use one or more network and/or system communication protocols. In some embodiments, the user application 247 may be associated with a mobile device, wherein the mobile device executes a check deposit application. In some embodiments, the user application 247 may be associated with an ATM at one of the entity's facilities. Thus, the ATM may include a check imaging system wherein the check imaging system captures an image of the check. Following successful capture of the image of the check, the ATM may transmit the image to the system 230 for processing, storage, generation of an image of the check, or the like. In other embodiments, the user application 247 may interact with a bank teller, his equipment, a kiosk in the entity's facility, or the like associated with the entity.

Also shown in FIG. 2 is the user interface 249. In some embodiments, the user interface 249 includes one or more output devices, such as a display and/or speaker, for presenting information to the user 245. In some embodiments, the user interface 249 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user 245. In some embodiments, the user interface 249 includes the input and display devices of a mobile device, which are operable to receive and display information.

FIG. 2 also illustrates a system 230, in accordance with an embodiment of the present invention. The system 230 may include any computerized apparatus that can be configured to perform any one or more of the functions of the system 230 described and/or contemplated herein. In accordance with some embodiments, for example, the system 230 may include a computer network, an engine, a platform, a server, a database system, a front end system, a back end system, a personal computer system, and/or the like. Therefore, the system 230 may be a server managed by the entity. The system 230 may be located at the facility associated with the entity or remotely from the facility associated with the entity. In some embodiments, such as the one illustrated in FIG. 2, the system 230 includes a communication interface 232, a processor 234, and a memory 236, which includes a system application 237 and a datastore 238 stored therein. As shown, the communication interface 232 is operatively and selectively connected to the processor 234, which is operatively and selectively connected to the memory 236.

It will be understood that the system application 237 may be configured to implement any one or more portions of the various user interfaces and/or process flow described herein. The system application 237 may interact with the user application 247. It will also be understood that, in some embodiments, the memory includes other applications. It will also be understood that, in some embodiments, the system application 237 is configured to communicate with the datastore 238, the user input system 240, or the like.

It will be further understood that, in some embodiments, the system application 237 includes computer-executable program code portions for instructing the processor 234 to perform any one or more of the functions of the system application 237 described and/or contemplated herein. In some embodiments, the system application 237 may include and/or use one or more network and/or system communication protocols. In some embodiments, the system application 237 may include the processing of the image of Check 1 300 from which the system 230 may collect check information.

In addition to the system application 237, the memory 236 also includes the datastore 238. As used herein, the datastore 238 may be one or more distinct and/or remote datastores. In some embodiments, the datastore 238 is not located within the system and is instead located remotely from the system. In some embodiments, the datastore 238 stores information or data described herein. For example, the datastore 238 may store information associated with the user's account, check information, or the like. Further, the datastore 238 may comprise an archive, temporary storage locations, or the like.

It will be understood that the datastore 238 may include any one or more storage devices, including, but not limited to, datastores, databases, and/or any of the other storage devices typically associated with a computer system. It will also be understood that the datastore 238 may store information in any known way, such as, for example, by using one or more computer codes and/or languages, alphanumeric character strings, data sets, figures, tables, charts, links, documents, and/or the like. Further, in some embodiments, the datastore 238 may include information associated with one or more applications, such as, for example, the system application 237. It will also be understood that, in some embodiments, the datastore 238 provides a substantially real-time representation of the information stored therein, so that, for example, when the processor 234 accesses the datastore 238, the information stored therein is current or substantially current. FIG. 4 expresses the datastore 238 and its contents in more detail.

FIG. 2 also shows two images of checks that interact with the system environment 200. The image of Check 1 300 may be the image of the check that is received by the user input system 240. The user input system 240 may collect the check information from the image of Check 1 300. The image of Check 2 500 may be the image of the check that is generated by the system 230. The image of Check 2 500 may be generated based on the check information stored in the datastore 238. Both images of Check 1 300 and Check 2 500 may include an image of the entire check, a thumbnail version of the image of the check, individual pieces of check information, or the like.

It will be understood that the embodiment of the system environment illustrated in FIG. 2 is exemplary and that other embodiments may vary. As another example, in some embodiments, the system 230 includes more, less, or different components. As another example, in some embodiments, some or all of the portions of the system environment 200 may be combined into a single portion. Likewise, in some embodiments, some or all of the portions of the system 230 may be separated into two or more distinct portions.

In addition, the various portions of the system environment 200 may be maintained for and/or by the same or separate parties. It will also be understood that the system 230 may include and/or implement any embodiment of the present invention described and/or contemplated herein. For example, in some embodiments, the system 230 is configured to implement any one or more of the embodiments of the process flows described and/or contemplated herein in connection any process flow described herein. Additionally, the system 230 or the user input system 240 is configured to initiate presentation of any of the user interfaces described herein. In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software. As used herein, an apparatus may refer to at least one of the user input system 240 or the system 230.

Now referring to FIG. 3, FIG. 3 illustrates an exemplary image of Check 1 300, the image of the check received by the user input system 240. The image of Check 1 300 may comprise an image of the entire check, a thumbnail version of the image of the check, individual pieces of check information, or the like. Check 1 300 comprises check information, wherein the check information comprises contact information 305, the payee 310, the memo description 315, the account number and routing number 320 associated with the appropriate user or customer account, the date 325, the check number 330, the amount of the check 335, the signature 340, or the like. In some embodiments, the check information may comprise text. In other embodiments, the check information may comprise an image. The user input system 240 may capture an image of Check 1 300 and transmit the image to the system 230 via a network. The system 230 may collect the check information from the image of Check 1 300 and store the check information in the datastore 238. In some embodiments, the pieces of check information may be stored in the datastore 238 individually. In other embodiments, multiple pieces of check information may be stored in the datastore 238 together. In some embodiments, the pieces of check information may be stored in the datastore 238 immediately following the capture of the image of Check 1 300. In other embodiments, the pieces of check information may be stored in the datastore 238 at a predetermined point in time after the image of Check 1 300 has been captured. The entity may reserve the right to determine the point in time in which the check information is stored in the datastore 238. In some embodiments, the check information may be captured or stored in the datastore 238 at a lower resolution than the original image of the check. In other embodiments, the check information may be captured or stored in the datastore 238 at a higher resolution than the original image of the check. In some embodiments, the check information may be captured or stored in the datastore 238 at a reduced size. In other embodiments, the check information may be captured or stored in the datastore 238 at an increased size.

Now referring to FIG. 4, FIG. 4 illustrates an example of the datastore 238. The system 230 may store the pieces of check information of the processed check in one or more datastores 238. In some embodiments, a datastore 238 may comprise at least one element of check information for multiple checks. For example, a datastore 238 may include check numbers (or payee names, check amounts, check dates, signatures, or the like) for multiple checks. In other embodiments, multiple checks may share a single datastore 238 for the storage of their check information. Items 410, 420, 430, and 440 represent categories of check information in the datastore 238. For example, categories of check information may include but are not limited to the check number, the payee, the amount of the check, the memo description, the contact information, the date, the signature, the account number and routing number, or the like. Further, associated pieces of check information for a single check may be linked with one another using data or metadata. For example, check number 0001 and payee name 0001 may be associated with each other for ease of access.

Referring now to FIG. 5, FIG. 5 illustrates the image of Check 2 500. The image of Check 2 500 comprises an image of the entire check, a thumbnail version of the image of the check, individual pieces of check information, or the like. The system 230 may retrieve the pieces of check information to generate a new image of Check 2 500. In some embodiments, the retrieved pieces of check information may be presented in the image of Check 2 500 at a lower resolution than the original image of the check. In other embodiments, the check information may be presented in the image of Check 2 500 at a higher resolution than the original image of the check. In some embodiments, the check information may be presented in the image of Check 2 500 at a reduced size. In other embodiments, the check information may be presented in the image of Check 2 500 at an increased size. Check 2 500 may comprise check information, wherein the check information may comprise contact information 505, the payee 510, the memo description 515, the account number and routing number 520 associated with the appropriate user or customer account, the date 525, the check number 530, the amount of the check 535, the signature 540, or the like.

The present invention may enable an apparatus (e.g. a computer system) associated with the entity to retrieve, capture, store, and recall information from the check. However, rather than capturing, storing, and recalling one image of the entire check, the present invention presents novel ways in which the apparatus captures and stores only the pieces of the necessary information (including but not limited to the payee, the amount, the memo, the date, the signature, or the like) that are needed to positively identify the transaction. This information may be collected, combined, or displayed to recreate the original image of the check without using as much storage space as capturing one image of the entire check.

In some embodiments, the apparatus may physically capture the image of the check. The apparatus may include a camera or a digital image capturing function to obtain the image of the check. In some embodiments, the image of the check may be captured by the user's mobile device (smart phone, laptop, webcam, tablet, or the like). A camera embedded into the mobile device may capture the image of the check, wherein the mobile device may transmit to the apparatus the image of the check. Thus, the apparatus may involve image retrieval functions or technologies to accept the image of the check from a mobile device. In other embodiments, the image of the check may be captured by a computing device associated with one of the entity's facilities (an ATM, a bank teller's workstation, or the like), wherein the image of the check may be transmitted to and retrieved by the apparatus.

Current regulations of the financial industry require all images of checks to be captured at a minimum resolution level of 200 dots per inch (DPI). By regulation, these images of checks must be held at a minimum resolution level of 200 DPI for a minimum period of ninety days. Furthermore, all images of checks must be maintained in an archive (datastore, database, memory, server space, or the like) for a minimum period of seven years. The required resolution of the archived image of the check may be undeclared. Storing images of checks at a resolution of at least 200 DPI may require a lot of storage space in the archive. Furthermore, in some embodiments, duplicate images of the same check at this resolution may currently exist in multiple locations in the archive. The present invention introduces a more efficient method of capturing, storing, and recalling image of the checks for both the ninety-day required period and the seven-year required period.

To comply with these regulations, the apparatus may first capture an image of the entire check. The image of the check may be captured by the apparatus at a minimum resolution of 200 DPI. In some embodiments, the image of the check may be kept for a minimum of ninety days to ensure compliance with the above regulations. In some embodiments, the image of the check may be moved, modified, deleted, or the like after the ninety-day period is completed. Hence, the space in storage that the image of the check was occupying may now be allocated by the apparatus for other purposes or processes. Thus, deletion of the image of the check may ensure maximum efficiency of storage space. To further comply with the regulations, deletion of the image of the check may also require that a copy of the image of the check is stored in the archive. In other embodiments, the image of the check may be kept for longer than ninety days. The entity may reserve the right to determine the period of time that the image of the check may be kept in storage.

In some embodiments, the image of the check may be processed or modified by the apparatus for specific purposes. In some embodiments, the image of the check may be stored in a temporary location (a cache, proxy, or the like) for ease of modification, deletion, transportation, or the like. In other embodiments, after capture, the image of the check may be stored in the apparatus, the archive, or the like.

Processing the image of the entire check may enable the apparatus to split check information into individual pieces of check information of varying formats. In some embodiments, the check information may comprise smaller images. An example of a smaller image may be the signature on the check. Because the area including and surrounding the signature is smaller than the entire check, the smaller image may require less space in storage or in the archive. Thus, storing the smaller image in the archive thus may prove to be more economical than storing an image of the entire check. Furthermore, because the pieces of check information may be smaller in size, the apparatus may be able to capture the pieces of check information at a higher resolution without using more storage space. This may enable zooming or a higher image quality when viewing the pieces of check information. In other embodiments, the check information may comprise text. An example of textual check information may include but is not limited to the check number, payee name, the amount, the date, the contact information, the account number, the routing number, the memo, or the like. Thus, the text may be transformed into data or metadata that is consistent with the entity's existing nomenclature protocols. Using text in lieu of an image may require less space in storage or in an archive and thus may be more economical.

Furthermore, the smaller pieces of information may be accessible to the user or the agent associated with the apparatus. An example may be if the user wishes to verify the signature of a recently written check. Previously, the user may have had to locate the check by a check number or date. Upon finding the correct check, the user may have had to view the entire check with the signature existing at a low resolution. Instead, the present invention may enable the user to search a database of text fields or entries based on a much more specific spectrum of criteria, including individual pieces of check information, such as the signature. Another example may be if the agent needs to edit pieces of check information, clean up the image of the check or the thumbnail version of the image of the check, or the like. In some embodiments, the signature (or any other piece of individual information) may be viewed independently of the entire image of the check.

The apparatus may use the pieces of information gathered from the image of the check to recreate the original image of the check. The apparatus may utilize a template to recreate the image of the check. In some embodiments, the recreated image of the check may match the original image of the check. In other embodiments, the recreated image of the check may not match the original image of the check in appearance, but the information may be identical. In some embodiments, the apparatus may recreate the image of the check with smaller images from the original check. In some embodiments, the apparatus may recreate the image of the check with text corresponding to data on the original check. In other embodiments, the apparatus may recreate the image of the check with a combination of smaller images and text.

In some embodiments, the apparatus may create a copy of the image of the check at the point in time that the image of the check is captured or received by the apparatus. In some embodiments, the apparatus may create a copy of the image of the check after the point in time that the image of the check is captured. The entity may reserve the right to determine the time delay between capturing or receiving the image of the check and creating the copy of the image of the check. In some embodiments, the apparatus may copy the image of the check at the same resolution as the original image of the check. In other embodiments, the apparatus may reduce the size of the image of the check to a lower resolution. The entity may reserve the right to determine the appropriate DPI value of the lower resolution copy. The lower resolution or resized copy of the image of the check may be referred to as a "thumbnail." In some embodiments, the thumbnail version of the image of the check may be a smaller dimension version of the image of the check, a larger dimension version of the image of the check, a lower resolution version of the image of the check, or a higher resolution version of the image of the check. Storing in the archive the thumbnail version of the check may require less space (and therefore money).

In some embodiments, the apparatus may store in the archives the thumbnail version of the image of the check as opposed to the 200 DPI version of the image of the check for the mandated seven-year period. Furthermore, the stored thumbnail may fulfill the regulatory requirements. In other embodiments, the apparatus may determine that the 200 DPI version of the image of the check is to be saved in the archives for the seven year period.

In some embodiments, the apparatus may copy the data or metadata associated with the image of the check and assign the data or metadata to the thumbnail version of the image of the check. In some embodiments, the copied data or metadata may match the information associated with the original check. In other embodiments, the data or metadata that is copied from the original image of the check may be modified. In some embodiments, the thumbnail may require less data or metadata than the original image of the check to be appropriately indexed by the apparatus. In other embodiments, the thumbnail may require the same data or metadata as the original image of the check to be appropriately indexed by the apparatus. In alternate embodiments, the apparatus may associate two thumbnail versions of images of two checks using data or metadata.

The apparatus may associate the original image of the check with the newly created thumbnail version of the image of the check. An association between the two images may enable the user to link the two images together, easily find one from the other, replace on with the other, or the like. In some embodiments, a limited amount of data or metadata may be used to associate the two images. For example, the associated data or metadata may identify the high resolution image of the check with the corresponding thumbnail version of the image of the check. In other embodiments, the original image of the check and the thumbnail version of the image of the check may refer to the same index in the archives.

In some embodiments, the apparatus may be able to restore the thumbnail version of the image of the check to the original image of the check's resolution of 200 DPI (or higher). The restored image of the check may allow the user to view the image of the check in higher quality or on a bigger screen. For example, if the user needs a 200 DPI version of the image of the check and one does not exist in the archive, the apparatus may utilize the thumbnail version of the image of the check of a lower resolution to create a 200 DPI version of the image of the check. In other embodiments, the apparatus may not need to restore the thumbnail to a higher resolution.

At the point in time that the image of the check is captured, the apparatus may store the image of the check or thumbnail in the archives of images, data, or metadata. In some embodiments, the apparatus may store the image of the check at the point of capture. In some embodiments, the apparatus may store the thumbnail immediately after the thumbnail is created. In some embodiments, the apparatus may store the image of the check at a time after the image of the check is captured. In some embodiments, the apparatus may store the thumbnail at a time after the thumbnail is created. The entity may reserve the right to determine the amount of time that the apparatus must wait until it may store in the archives the image of the check or thumbnail.

The current check imaging system may take up to three business days for the image of the check to be stored in the archive and thus deemed accessible. Based on the current system, the image of the check may only be stored in the archive after successfully undergoing perfection processing, a three-day process in which the image of the check is examined for information accuracy, quality, or the like. During perfection processing, the image of the check may be treated or manipulated according to the user's requests. For example, perfection processing may resize or improve the resolution of the entire image of the check or individual pieces of check information. The present invention may reduce the duration of perfection processing for a variety of reasons. In some embodiments, internal operations may need to access the archived image of the check to correct the check's information or manually modify the image of the check. By storing the image of the check in the archives at the point of capture, the present invention may enable internal operations to access the stored image of the check while the image of the check undergoes perfection processing. In other embodiments, advancements in technology may execute perfection processing with higher accuracy and a quicker turnaround time than when perfection processing was originally designed.

When the apparatus stores the image of the check (or thumbnail version of the image of the check) in the archives, the apparatus creates a reference to the image of the check. This reference may enable the user to locate the image of the check, search for the image of the check, modify the image of the check, process the image of the check, view the image of the check, view pieces of the image of the check, or execute any other type of function with the image of the check. The reference may serve as an index for the image of the check and may link multiple images of the same check together.

In some embodiments, the apparatus may utilize a sequence number (an internal number used to identify the record in the archives associated with the image of the check) to identify the record that corresponds to the image of the check in the archives. A sequence number may include but is not limited to a 6-digit number that is unique to each business day, data, metadata, the machine number that captured the image of the check, or the like. In other embodiments, a unique identification number may be assigned to the image of the check upon storage.

The purpose of creating a reference may be to provide the user with one point of reference for the image of the check, the thumbnail version of the image of the check, smaller images, or the associated data or metadata. In some embodiments, different versions of the same image, such as the original image of the check and the thumbnail version of the image of the check, may share the same reference in the archive. In some embodiments, different versions of images of the same check may be referenced independently. In other embodiments, different versions of images of the same check may replace one another as references are updated.

The user may have control of the archived image of the check, the thumbnail version of the image of the check, check information, smaller images, or its associated data or metadata. Utilizing the archive references may enable the user to easily control, modify, view, transport, or delete the image of the check (or its associated formats and check information). In some embodiments, the apparatus may present to the user a menu of control options with which to interact with the image of the check. In some embodiments, user authentication may be required to access the reference of images. For example, if the user wishes to access the image of the check in his customer account, the user may be prompted to enter a password, a personal identification number (PIN), an International Mobile Station Equipment Identity (IMEI) number, an answer to a security question, or the like. In other embodiments, user authentication may not be required to access the reference of images.

Using the reference as an index to locate the image, the user may recall the image of the check, the check information, or the thumbnail version of the image of the check from the archives. In some embodiments, the apparatus may return to the user only one image of the check. For example, if the user wishes to view only one piece of information on a check, such as a signature, the user may request to view only the signature. The apparatus may then return to the user the image of the signature. In other embodiments, multiple images of checks, check information, or thumbnail versions of the images of checks may be requested and returned to the user as one document.

In some embodiments, the apparatus may automatically bundle multiple images together. For example, the apparatus may enable computer-readable code that determines user activity. User activity may be defined by purchasing habits, location preferences, or the like. Based on user activity, the apparatus may automatically determine which groupings of images may be requested most often by cross-referencing the detected user activity with a database (or other memory location) of customer accounts, frequent transactions, security answers, or the like. Thus, the user may receive the information and images he demands without input or selection. In other embodiments, the user may manually select a number of images of checks to manipulate, execute, delete, or the like and view them on one page. Examples include creating a report involving multiple images of checks, viewing a monthly statement that possesses multiple thumbnails, or sorting multiple images of the checks by certain data or metadata criteria. The apparatus's ability to transport multiple images of checks may provide the entity with further storage cost savings.

The apparatus may create a document displaying the requested images of checks. In creating the document, the apparatus may resize or change the resolution of the image of the check, the thumbnail version of the check, individual pieces of check information, or the like. In some embodiments, the document may comprise images of entire checks. In some embodiments, multiple images of checks may be presented on the same document. For example, if the user requests all check images that were drafted to a certain payee, on a certain date, over or under a certain amount, or the like, the apparatus may generate one document with the requested information. The document may be transmitted to a second apparatus (a mobile device or other computing device) and presented to the user.

In some embodiments, the document (including the comprised images and information) may be formatted to the specific type of device to which the apparatus transmits the document. For example, if the request for the document originates from the user's mobile device, such as a cell phone, the document and included images and information may be resized to fit on the smaller screen. In contrast, if the request for the document originates from the user's desktop computer with a large display, the document and included images and information may be viewed at their original size and resolution, or even upscaled to a larger size and a higher resolution for more detailed viewing.

In some embodiments, the apparatus may determine the settings of the image of check (or the thumbnail version of the image of the check) based on user preferences. For example, the user or the agent may access through a menu of settings or preferences various selections for image resolution, image size, length of storage, or the like. Furthermore, the user may select from a list of categories which image of the check the user wishes to view. For example, the user may select from categories such as a payee name, a payee type, an amount on the check, a date range, or the like. Based on user input from this selection menu, the apparatus may appropriately resize, store, and recall the image of the check. In alternate embodiments, the apparatus may autonomously determine the settings of the image of the check. For example, the apparatus may interpret image preferences or settings based on user activity. Based on the user activity the apparatus may assign the user into the appropriate category of users or user segments. The appropriate category of users or user segments may enable the apparatus to predict and assign the correct settings to the image of the check or the user's account with a degree of accuracy.

During processing of the image of the check, the apparatus may restrict access to the user. The apparatus may grant the user access to the image of the check once the apparatus posts the image of the check to the user's account. In some embodiments, the apparatus may group users together based on the status of their associated images of checks. In some embodiments, the image of the check will be processed at the transaction level, meaning substantially simultaneously to completing the transaction. In other embodiments, the apparatus may group together multiple images of checks for processing in bulk.

The apparatus may prompt the user for authentication in order to retrieve the image of the check after processing of the image of the check has completed. In some embodiments, the image of the check may be accessible by the agent during processing of the image of the check. In some embodiments, the agent may be granted access to images of checks from a first set of user accounts, while the agent may not be granted to images of checks from a second set of user accounts. In some embodiments, the apparatus may require additional security measures to enable access for the agent. In some embodiments, the security measures for the agent may be similar to the security measures for the user. In some embodiments, the security measures for the agent may differ from the security measures for the user. For example, the agent may be prompted to enter an employee number, a badge number, or similar proprietary identification information related to the entity.

When the apparatus creates a document with at least one image of at least one check, the apparatus may store the document in the archive (e.g., a datastore). In some embodiments, the apparatus may store the document in the archive substantially simultaneously to generating the document. In other embodiments, the apparatus may store the document in the archive at a predetermined time after the document is generated. The entity may reserve the right to determine the length of time after which the document may be stored. The document may comprises check images (either processed or unprocessed images) associated with at least one user or multiple users.

The agent or the user may request the document in a variety of formats, including a portable document format (PDF), an image, text, links to web pages, or the like. Based on a variety of user activity or user preferences, the apparatus may be configured to learn the user habits or preferences. Based on an understanding of these user habits, preferences, or activity (which may be determined based on the history of retrieval requests, settings, or the like), the apparatus may determine an optimal storage location based on how often the document may be retrieved. For example, the apparatus may allocate its best storage resources to the document if it is determined to be retrieved at a high frequency or by a high priority of users. The apparatus may store the document with multiple images of checks based on retrieval requests, a type of payee, a name of payee, a country of transaction, an amount, a transaction date, a memo description, user settings, user activity over a predetermined period of time, a type of check, or the like. In some embodiments, the user may determine the size to which the image of the check is resized, the size at which the image of the check is stored, the resolution to which the image of the check is resized, or the resolution at which the image of the check is stored.

In some embodiments, the apparatus receives a user preference for generating a document of check images, wherein the generated document is stored in a storage medium that enables quicker access. In other embodiments, the apparatus determines a user preference based on user activity over a period of time. The user preference may include at least one of a type of payee, a name of payee, a country of transaction, an amount, a transaction date, a memo description, a type of check (e.g., a personal check, a certified check, a pay check, or the like), or the like. As used herein, a document may comprise any type of computer-readable file.

In some embodiments, the document's storage location may be determined based on user preferences. User preferences may be selected manually by the user or gathered automatically by the apparatus based on user activity and user habits.

The apparatus's functionality may depend on network connectivity, network speeds, network congestion, signal interference, or the like. In some embodiments, unexpected errors may occur during normal installation, operation, or transactions. Potential errors may include but are not limited to run time errors, network connectivity errors, slow network speed errors, network congestion, poor reception, signal interference, dropped packets of information, or the like.

The apparatus provides or hosts a digital financial service application for mobile device users. Within the application, transactions may include but are not limited to check deposits, fund withdrawals, account summaries, fund deposits, fund transfers, service requests, creating an account, closing an account, contacting a service assistant, or the like. The apparatus may be created to save the user time and hassle when starting the application and executing financial transactions.

The apparatus interacts with a mobile device that exists as a means of communication between the user and the entity. In some embodiments, the mobile device may be a handheld computing device (laptop, personal digital assistant (PDA), cell phone, smart phone, tablet, mp3 player, chip, or any other electronic device). In other embodiments, the mobile device may be a computer processor (or similar electronic component) that is embedded in existing systems. FIG. 2 may present a more detailed overview of the communication system of the present invention.

Referring now to FIG. 6, FIG. 6 a general process flow 600 is provided for storing an image of a check. At block 610, the method comprises receiving an image of a check. At block 620, the method comprises generating a thumbnail version of the image, wherein the thumbnail version of the image is generated immediately after receiving the image. At block 630, the method comprises linking the image with the thumbnail version of the image. At block 640, the method comprises storing the image and the thumbnail version of the image, wherein the thumbnail version of the image is stored for a longer period of time than the image.

Referring now to FIG. 7, FIG. 7 a general process flow 700 is provided for enabling access to an image of a check. At block 710, the method comprises receiving an unprocessed image of a check. At block 720, the method comprises storing the unprocessed image, wherein the unprocessed image is accessible to an agent associated with the apparatus and is not accessible to a user of an account associated with the check. At block 730, the method comprises processing the unprocessed image. At block 740, the method comprises storing the processed image, wherein the processed image is accessible to the agent and is not accessible to the user.

Referring now to FIG. 8, FIG. 8 a general process flow 800 is provided for processing at least one request to retrieve an image of a first check and a second check. At block 810, the method comprises receiving, from a second apparatus, at least one request to retrieve an image of a first check and a second check. At block 820, the method comprises retrieving a first thumbnail version of the image of the first check. At block 830, the method comprises retrieving a second thumbnail version of the image of the second check. At block 840, the method comprises generating a document comprising the first thumbnail version and the second thumbnail version. At block 850, the method comprises transmitting the document to the second apparatus.

Referring now to FIG. 9, FIG. 9 presents an exemplary user interface, in accordance with some embodiments of the invention. The user interface may be presented on the user's mobile device when the user wishes to access to an image of the check. A menu may be presented to the user which allows the user to select several viewing options. If the user wishes to view the higher resolution image of the check, the user may select the 'View Image of the check' 910 tab. This tab may present to the user's mobile device the image of the check. The apparatus may enable zooming in and out on the image of the check. If the user wishes to create a thumbnail version of the image, the user may select the 'Create Thumbnail' 920 tab. This tab may generate a lower resolution copy of the image of the check, which may be stored in the archives. Selecting the 'View Check Information' 930 tab may present to the user a menu of check information to be viewed either independently or as a bundled group. FIG. 11 presents a more detailed user interface for viewing check information. If the user wishes to store the image of the check, the user may select the 'Store Image of the check' 940 tab. This tab may present to the user a menu that enables the user to store the image of the check in the proper location. A more thorough explanation of the 'Store Image of the check' 940 tab and associated menu is presented in FIG. 10.

Referring now to FIG. 10, FIG. 10 presents an exemplary user interface, in accordance with some embodiments of the invention. The user interface may be presented on the user's mobile device when the user wishes to store an image of the check. The user may select the 'Select Image of the check' 1010 tab to select the image of the check from a menu. The image of the check may be a digital image of the check, individual pieces of check information (a signature, a payee, an amount, or the like), the thumbnail version of the check, or the like. In some embodiments, more than one image of the check may be selected. Once the image of the check is selected, the user may select the 'Select Storage Location' 1020 tab. This tab enables the user to select from a menu where he stores the image of the check. For example, if the user wishes to store a high resolution image of the check, he may select to store the image in a temporary storage location to save space in the archive. Conversely, if the user wishes to store a thumbnail version of the image, the user may select to store the thumbnail version of the image in the archives. Once the image of the check storage location is selected, the user may select the 'Select Storage Time' 1030 tab. This tab enables the user to select from a menu for how long the image will be stored. For example, if the user wishes to save the thumbnail version of the image in the archive for the mandated seven year period, then the user would select seven years in the 'Select Storage Time' 1030 tab. A higher resolution image may be stored for the mandated period of ninety days.

Referring now to FIG. 11, FIG. 11 presents an exemplary user interface, in accordance with some embodiments of the invention. The user interface may be presented on the user's mobile device when the user wishes to view the check information associated with the image of the check. A menu may be presented to the user which allows the user to select various pieces of information for viewing. Check information may be presented as text or as an image. If the user wishes to view the date of the check, the user may select the 'Date' 1110 tab. If the user wishes to view the payee of the check, the user may select the 'Payee' 1120 tab. If the user wishes to view the amount of the check, the user may select the 'Amount' 1130 tab. If the user wishes to view the signature of the check, the user may select the 'Signature' 1140 tab. If the user wishes to view a full summary of check information, the user may select the 'Full Summary' 1150 tab. This tab may present to the user a combination of text and images that enable to view the check information at a glance.

Referring now to FIG. 12, FIG. 12 presents an exemplary user interface, in accordance with some embodiments of the invention. The user interface may be presented on the user's mobile device when the user wishes to retrieve thumbnail versions of the at least one image of the check. A menu may be presented to the user which allows the user to select one or more images, and then retrieve those images. The 'Select Image 1' 1210, 'Select Image 2' 1220, and 'Select Image 3' 1230 tabs may present to the user a menu to select the image. This menu may include options to select thumbnail versions of the images of the checks. The 'Retrieve Images' 1240 tab enables the user to retrieve the selected images. In some embodiments, the apparatus may present multiple images on one document, thus allowing the user to quickly overview multiple image of the checks or thumbnail versions of the image of the checks. As used with respect to the figures described herein, a "mobile device" may refer to any computer device, including but not limited to portable or non-portable devices.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. An apparatus for enabling access to an image of a check, the apparatus comprising:
   a memory;
   a processor; and
   a module stored in the memory, executable by the processor, and configured to:
   receive an unprocessed image of a check;
   store the unprocessed image, wherein the unprocessed image is accessible to an agent associated with the apparatus and is not accessible to a user of an account associated with the check;
   enable the agent to edit individual pieces of check information associated with the unprocessed image during processing of the unprocessed image;
   process the unprocessed image to create a processed image and a thumbnail version of the unprocessed image;
   store the processed image, wherein the processed image is accessible to both the agent and the user.

2. The apparatus of claim 1, wherein receiving the unprocessed image further comprises capturing the unprocessed image.

3. The apparatus of claim 1, wherein processing the unprocessed image further comprises collecting check information.

4. The apparatus of claim 3, wherein the check information comprises text or an image.

5. The apparatus of claim 3, wherein the module is further configured to store the check information in an archive.

6. The apparatus of claim 3, wherein the module is further configured to enable editing of the check information.

7. The apparatus of claim 1, wherein processing the unprocessed image further comprises processing the unprocessed image of the check in less than or equal to three days.

8. The apparatus of claim 1, wherein processing the unprocessed image comprises at least one of:
- selectively processing individual pieces of check information associated with the unprocessed image based on each type of check information;
- processing multiple pieces of check information associated with the unprocessed image substantially simultaneously.

9. The apparatus of claim 1, wherein the module is further configured to determine the authenticity of the user or the user's habits by cross-referencing the unprocessed image with a database of customer accounts, frequent transactions, or security answers.

10. The apparatus of claim 1, wherein processing the unprocessed image further comprises treating the image.

11. The apparatus of claim 1, wherein the module is further configured to communicate with a second apparatus.

12. The apparatus of claim 11, wherein the second apparatus includes at least one of a mobile device, an offsite server, an internal server, a new memory location, a datastore, or an archive.

13. The apparatus of claim 1, wherein the module is further configured to create a reference as an index for the stored image, wherein the reference functions as an index to locate the stored image.

14. The apparatus of claim 13, wherein the reference comprises a sequence number or a unique identification number.

15. The apparatus of claim 1, wherein processing the unprocessed image comprises resizing or changing a resolution of the unprocessed image to create the processed image.

16. The apparatus of claim 1, wherein the module is further configured to associate the unprocessed image with the processed image.

17. A method for enabling access to an image of a check, the method comprising:
- receiving, using a computing device processor, an unprocessed image of a check;
- storing, using a computing device processor, the unprocessed image, wherein the unprocessed image is accessible to an agent associated with an entity and is not accessible to a user of an account associated with the check;
- enabling, using a computing device processor, the agent to edit individual pieces of check information associated with the unprocessed image during processing of the unprocessed image;
- processing, using a computing device processor, the unprocessed image to create a processed image and a thumbnail version of the unprocessed image;
- storing, using a computing device processor, the processed image, wherein the processed image is accessible to both the agent and the user.

18. A computer program product for enabling access to an image of a check, the computer program product comprising a non-transitory computer-readable medium comprising code causing a computer to:
- receive an unprocessed image of a check;
- store the unprocessed image, wherein the unprocessed image is accessible to an agent associated with an entity and is not accessible to a user of an account associated with the check;
- enable the agent to edit individual pieces of check information associated with the unprocessed image during processing of the unprocessed image;
- process the unprocessed image to create a processed image and a thumbnail version of the unprocessed image;
- store the processed image, wherein the processed image is accessible to both the agent and is not accessible to the user.

\* \* \* \* \*